UNITED STATES PATENT OFFICE.

FREDERICK AUGUSTINE HURD, OF COOKSHIRE, CANADA, ASSIGNOR TO CHARLES CLEVELAND BAILEY, OF COOKSHIRE, CANADA.

MANUFACTURE OF CHEESE.

SPECIFICATION forming part of Letters Patent No. 707,698, dated August 26, 1902.

Application filed December 16, 1901. Serial No. 86,076. (No specimens.)

*To all whom it may concern:*

Be it known that I, FREDERICK AUGUSTINE HURD, a subject of the King of Great Britain, and a resident of Cookshire, in the county of Compton, in the Province of Quebec, in the Dominion of Canada, have invented new and useful Improvements in the Manufacture of Cheese, of which the following is a specification.

My invention consists in the herein-described manipulation or treatment of fresh sweet skimmed milk and sour buttermilk for the manufacture of a highly-digestible cheese.

Cream after being separated from whole milk is allowed to stand for two or more days, or until it becomes sour. The cream is then churned, preferably in a churn in which air is permitted to pass through the cream while churning. The butter produced is washed with water, and the water, with the casein therein, is mixed with the sour buttermilk and fresh sweet skimmed milk mixed therewith. The proportionate quantity may vary, but is usually three or four parts of skimmed milk to one of buttermilk. If, however, less skimmed milk is used, the cheese will be richer, but not impaired in digestive quality. After the skim-milk and buttermilk are mixed together, as aforesaid, the liquid and solid matters separate by precipitation, the former constituting whey and the latter curd. The whey is then drawn off, leaving the curd or casein in the bottom of the mixing-tank. The curd is then placed in cotton bags or other suitable strainers to drain off the whey. Mixture of the skim and butter milks produces a soft curd or casein containing the solids of the milk, which curd is not capable of resisting much pressure without dissolving into a liquid. After, say, two days' draining the curd is dumped on a table or stand, preferably having a canvas top, and occasionally gently stirred, whereby all parts will be exposed to the atmosphere. After being so exposed for a day or two to cure or change it will assume the flavor of new cheese, and while being exposed to the atmosphere the cured curd is salted to suit the taste, as in ordinary cheese-making. After being so treated and salted the curd is placed in small cheese-hoops and slightly pressed to remove whey, much pressure being objectionable, as causing the curd to dissolve. After being solidified in the hoops the cheese is removed and placed on shelves to dry for, say, a week, and after drying the cheese is disintegrated and firmly re-pressed in larger hoops for final curing by drying, as ordinarily done with factory full cheese, or the soft cheese pressed into packages or jars for market. The temperature of the milk is kept at from 60° to 70° Fahrenheit.

I claim as my invention—

1. The process of making cheese which consists in mixing buttermilk churned from sour cream with sweet fresh skimmed milk to precipitate curd, draining the curd and exposing the strained curd to the atmosphere until it assumes a cheese flavor, then slightly pressing the same, drying a sufficient time to solidify the mass, then disintegrating the same, and finally re-pressing the cheese, substantially as set forth.

2. The process of making skim-milk cheese which consists in precipitating curd by mixing sour buttermilk and sweet fresh skim-milk, drawing off the whey and draining the curd, aerating the strained curd, and salting to taste, then lightly pressing the aerated curd to remove whey and solidifying it by drying, then disintegrating the cured cheese and firmly re-pressing the same for market, substantially as set forth.

In testimony whereof I have signed my name to this specification in the presence of two subscribing witnesses.

FREDERICK AUGUSTINE HURD.

Witnesses:
  J. M. FLAWS,
  THOS. MACRAE.